US009292673B2

(12) United States Patent
Rutkowski et al.

(10) Patent No.: US 9,292,673 B2
(45) Date of Patent: Mar. 22, 2016

(54) VIRTUAL KEY MANAGEMENT AND ISOLATION OF DATA DEPLOYMENTS IN MULTI-TENANT ENVIRONMENTS

(71) Applicant: International Business Machines Corporation, Armonk, NY (US)

(72) Inventors: Matthew Francis Rutkowski, Pflugerville, TX (US); Ronald W. Bassett, Austin, TX (US); Thomas Alexander Bellwood, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/838,524

(22) Filed: Mar. 15, 2013

(65) Prior Publication Data

US 2014/0283010 A1   Sep. 18, 2014

(51) Int. Cl.
  *G06F 21/31*   (2013.01)
  *H04L 29/06*   (2006.01)
  *H04L 9/08*    (2006.01)

(52) U.S. Cl.
  CPC ............... *G06F 21/31* (2013.01); *H04L 9/083* (2013.01); *H04L 9/088* (2013.01); *H04L 9/0891* (2013.01); *H04L 63/0428* (2013.01); *H04L 63/06* (2013.01); *H04L 2209/601* (2013.01)

(58) Field of Classification Search
  CPC ....... H04L 9/083; H04L 9/088; H04L 9/0891; H04L 63/06
  See application file for complete search history.

(56) References Cited

U.S. PATENT DOCUMENTS

| 6,118,873 | A | 9/2000 | Lotspiech et al. |
| 7,403,618 | B2 * | 7/2008 | Van Rijnsoever et al. ..... 380/239 |
| 8,094,819 | B1 | 1/2012 | Limondin et al. |
| 2006/0265338 | A1 | 11/2006 | Rutkowski et al. |
| 2008/0192936 | A1 | 8/2008 | Bellwood et al. |
| 2011/0276490 | A1 * | 11/2011 | Wang et al. ....................... 705/50 |
| 2012/0185946 | A1 * | 7/2012 | Kamara et al. .................. 726/26 |
| 2013/0022200 | A1 | 1/2013 | Bellwood et al. |
| 2014/0019959 | A1 * | 1/2014 | Dodgson et al. .................. 718/1 |

OTHER PUBLICATIONS

Chang Jie Guo; Wei Sun; Ying Huang; Zhi Hu Wang; Bo Gao, "A Framework for Native Multi-Tenancy Application Development and Management," in E-Commerce Technology and the 4th IEEE International Conference on Enterprise Computing, E-Commerce, and E-Services, 2007. CEC/EEE 2007. The 9th IEEE International Conference on , vol., No., pp. 551-558.*
Da Silva et al, "Secure Group-Based Public Key Management for Mobile Ad Hoc Networks," Cyber Journals: Multidisciplinary Journals in Science and Technology, Journal of Selected Areas in Telecommunications (JSAT), May Edition, 2012.

* cited by examiner

*Primary Examiner* — Matthew Henning
(74) *Attorney, Agent, or Firm* — Robert Straight; David H. Judson

(57) ABSTRACT

Tenants in a multi-tenant shared deployment are provided their own distinct key spaces over which they control a key management system. In this manner, virtual key management domains are created on a per-tenant (per-customer) basis so that, whenever a particular customer's data is co-tenanted, stored, transmitted or virtualized in the IT infrastructure of the provider's datacenter(s), it is secured using key management materials specific to that customer. This assures that the entirety of a tenant's data remains secure by cryptographically isolating it from other tenants' applications. The virtual key management domains are established using a broadcast encryption (BE) protocol and, in particular, a multiple management key variant scheme of that protocol. The broadcast encryption-based virtual key management system (VKMS) and protocol achieves per-tenant (as well as per-application) secured isolation of data and can be used across any combination of resources in or across all levels of a co-tenanted IT infrastructure.

22 Claims, 8 Drawing Sheets

FIG. 7

| CONSTANT | VALUE | DESCRIPTION |
|---|---|---|
| $ID_{xxxxxxxxxx}$ | | • SUBSCRIBER REQUESTED DOMAIN ID. THE VKMS WILL MAY USE THIS DIRECTLY OR INDIRECTLY IN CREATING THE UNIQUE VKMD-ID WHICH CAN BE USED TO IDENTIFY DATA BOUND BY VKMS TO THE SPECIFIC DOMAIN |
| $iv_0$ | ADAPTATION SPECIFIC | THE INITIALIZATION VECTOR USED AT THE BEGINNING OF A CBC ENCRYPTION OR DECRYPTION CHAIN IS A CONSTANT, $iv_0$ |
| $h_0$ | ADAPTATION SPECIFIC | THE HASH INITIALIZER USED BY THE AES HASHING FUNCTION |
| $s_0$ | ADAPTATION SPECIFIC | A CONFIDENTIAL ADAPTATION-SPECIFIC SEED REGISTER (128-BIT VALUE) INITIALIZER USED IN THE CALCULATION OF SUBSIDIARY DEVICE KEYS AND PROCESSING KEYS |
| $r_0$ | ADAPTATION SPECIFIC | A CONFIDENTIAL ADAPTATION-SPECIFIC CONSTANT USED TO CALCULATE RECORDING KEYS |
| $t_0$ | ADAPTATION SPECIFIC | A CONFIDENTIAL ADAPTATION-SPECIFIC CONSTANT USED TO CALCULATE TITLE KEYS FROM THE TITLE KEY BLOCK |
| $k_0$ | ADAPTATION SPECIFIC | KEY CONVERSION DATA. A CONFIDENTIAL ADAPTATION-SPECIFIC CONSTANT USED TO CALCULATE MANAGEMENT KEYS AND MANAGEMENT KEYS PRECURSORS |

ADDITIONAL CONFIGURATION PARAMETERS THAT COULD BE INCLUDED IN THE VKMS-DD (TO SUPPORT ADDITIONAL KEY MANAGEMENT FUNCTIONALITY) INCLUDE, BUT ARE NOT LIMITED TO:
- CIPHER SELECTION
- CIPHER STRENGTH, KEY LENGTH

- MKB TREE DEPTH (AFFECTS LENGTH OF DEVICE IDs)
- NUMBER OF MKB DEVICE CLASSES (i.e. NUMBER OF "TRUST" CLASSES, IN OTHER WORDS THE NUMBER OF Kmv, VARIANT LEVELS AS EACH REPRESENTS A "TRUST" LEVEL
- NUMBER OF DEVICES PER DEVICE CLASS OR "TRUST" LEVEL (THIS COULD BE AN ORDER OF MAGNITUDE, OR RANGE)
- NUMBER OF RECORDING KEYS LEVELS (THIS SHOULD BE MENTIONED FOR FUTURE DISCLOSURES, BUT WILL NOT REFERENCE IN THIS DISCLOSURE. THIS REPRESENTS SPECIAL KEYS TO BE USED FOR ENCRYPTING DATA THAT NEEDS TO BE TIED TO A SPECIFIC "TRUST"CLASS)
- MKB VERIFICATION RECORD VALUES (i.e. Dv) - CONSTANT
- OPTIONAL CRC FUNCTIONS FOR DATA VALIDATION
- OPTIONAL "NONCE" CREATION ALGORITHMS AND FORMAT FOR USE ON TIME-DEPENDENT ENCRYPTED DATA (MESSAGES)

VIRTUAL KEY MANAGEMENT AND ISOLATION OF DATA DEPLOYMENTS IN MULTI-TENANT ENVIRONMENTS

BACKGROUND OF THE INVENTION

1. Technical Field

This disclosure relates generally to securing information in a cloud computing or other shared deployment environment wherein disparate parties share Information Technology (IT) resources.

2. Background of the Related Art

An emerging information technology (IT) delivery model is cloud computing, by which shared resources, software and information are provided over the Internet to computers and other devices on-demand. When multiple parties share resources within a cloud computing and other such shared deployment model, a compelling transformation and reduction in their IT costs (from fixed to variable) can be achieved. Using this approach, companies can extend computing and storage capacity elastically to match demand, shift operational and capital costs to an external data center, free IT staff to focus on new projects, and more. Cloud compute resources are typically housed in large server farms that run networked applications, typically using a virtualized architecture wherein applications run inside virtual servers, or so-called "virtual machines" (VMs), that are mapped onto physical servers in a data center facility.

Emerging cloud environments are being created out of existing IT infrastructures that are being adapted to support cloud-based services. One key characteristic of cloud computing that is different from existing environments is the requirement for so-called "multi-tenant" support, sometimes referred to as multi-customer single deployment. To satisfy this requirement, service providers have to be able to isolate different customer usage of the cloud services. Indeed, typically one of the most significant barriers keeping an enterprise customer from utilizing such resources is the ability to gauge a provider's security posture in relation to its own security compliance requirements.

In particular, shared environments have the potential to expose unprotected data to malicious attacks, hacking, and introspection by third parties, both intentional and otherwise. The service provider thus needs to maintain isolation between and among their specific customers that are sharing cloud resources. Thus, such systems need to ensure end-to-end trust and security of customer data regardless of their underlying networks, platforms, virtualization mechanism or middleware. Some of these problems can be addressed by the isolation of data and resources, and the use of VPNs and other such access mechanisms, but many cloud datacenters use non-traditional physical network configurations that negate traditional network isolation and that complicate VPN keying techniques. Presently, there are no single standard or obvious mechanisms in place to provide data security across all layers of a customer's virtual domain.

Most companies that desire to use cloud computing and other shared deployment models assign high value to their data and applications, and they consider them valuable intellectual property (IP). As noted above, these enterprises also may have legal, regulatory and/or their own corporate security policies that obligate them to preserve, at great lengths, the confidentiality of the data their applications access. One assumption in solving this problem is that encryption of data on a per-tenant basis within such shared/cloud infrastructures is necessary to address the needs of customers with sensitive data and/or highly confidential applications that use such data. To this end, one approach that has been suggested to address this problem is to have companies that wish to use public datacenters is to attempt to externally manage the encryption of their own data as a best defense against attacks within a shared infrastructure. This approach, however, reduces the usefulness of the data when valid accesses are needed to enable business workflows, since the management of the encryption (e.g., keys, authentication, and the like) and authentication/authorization protocols becomes a significant burden on the cloud customer.

Further, the complexity involved for shared datacenter providers to support end-to-end cryptographic security at all levels of a virtualized datacenter using existing key management systems, such as Public Key Infrastructure (PKI), has been prohibitive. This is because PKI-based encryption techniques are designed to establish trust and secure/encrypted data between two parties or endpoints. Although this may be sufficient for simple data/message exchange, in the more advanced workflows that are present in a cloud infrastructure, data traverses many endpoints and involves many services and resources over which the customer has no direct control. Further, attempts to employ PKI-based techniques are also unwieldy due to the need to manage the many public/private key pairs and their associated security policies. Indeed, in the worst case, every endpoint has a separate public/private key pair and security policy for handling the customer's data. Another problem with a PKI-based approach is that there is no means to renew the end-to-end security system, or to revoke or classify devices or system resources based upon relative levels of trust. Exposing such functionality to customers at the level of granularity needed in a complex environment also becomes untenable. Managing keys across hybrid or multi-cloud environments only compounds these issues.

Thus, there remains a need for an approach that provides for strong encryption of data yet is more easily manageable for both the shared datacenter provider and the companies that wish to subscribe to them.

BRIEF SUMMARY

According to this disclosure, tenants in a multi-tenant shared deployment are provided their own distinct key spaces over which they control a key management system. In this manner, virtual key management domains are created on a per-tenant (per-customer) basis so that, whenever a particular customer's data is co-tenanted, stored, transmitted or virtualized in the IT infrastructure of the provider's datacenter(s), it is secured using key management materials specific to that customer. This assures that the entirety of a tenant's data (including, without limitation, all generic data, and software applications) remains secure by cryptographically isolating it from other tenants' applications. The virtual key management domains are established using a broadcast encryption (BE) protocol and, in particular, a multiple management key variant scheme of that protocol. The broadcast encryption-based virtual key management system (VKMS) and protocol as described herein achieves per-tenant secured isolation of data and can be used across any combination of resources in or across the co-tenanted IT infrastructure. Within a specific virtual key management domain (VKMD) associated with a tenant, symmetric keys can then be established for each desired trust level (and used only in that specific domain).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates a representative VKMS Domain Data (VKMS-DD) data set;

DETAILED DESCRIPTION OF AN ILLUSTRATIVE EMBODIMENT

Figure 1:
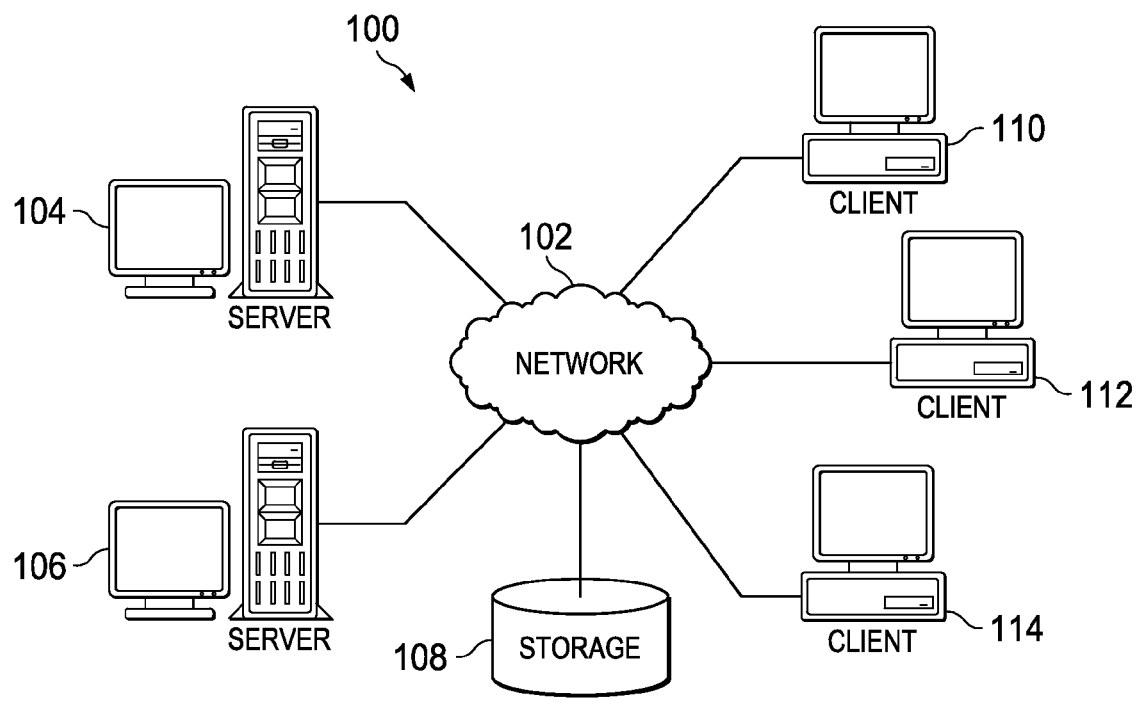
FIG. 1 depicts an exemplary block diagram of a distributed data processing environment in which exemplary aspects of the illustrative embodiments may be implemented.
Figure 2:
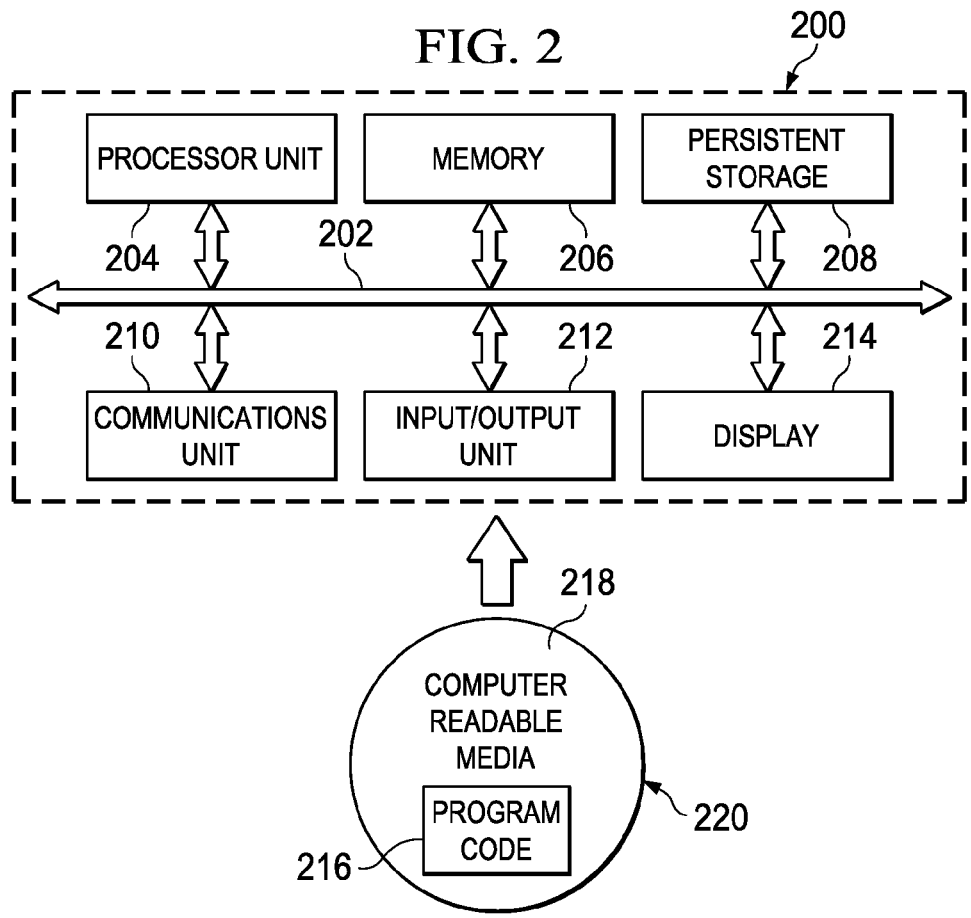
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Broadcast Encryption

As will be described below, the techniques of this disclosure take advantage of a known key management technique known as "broadcast encryption." The following section provides additional background details regarding this technique.

Broadcast encryption is an alternative to public-key cryptography. Unlike public-key cryptography, broadcast encryption allows two parties to agree upon a key without ever having a two-way conversation. Generally, it works by the originator sending a special block of data to the recipient. The special data block, sometimes referred to as a session or management key block, allows participating devices to calculate a key, referred to as a management key. A management key block is sometimes referred to as a media key block in earlier implementations. Each device has a set of device keys that allow it to perform this calculation. Each device does the calculation in a different way so that, if a device's keys are compromised, new management key blocks can be produced where those compromised keys can no longer be used to calculate the management key. In general, management key blocks are produced by a single trusted agency or entity that also assigns every device its keys. The management key blocks are distributed to every device in the system that may want to send a message. To send a message, the originator processes the management key block to obtain the management key, which it then uses to encrypt the message. The management key used for messages may be different for different trust levels of devices, with each such different key sometimes referred to as a management key variant. The originator then sends to the recipient both the encrypted message and the management key block. The recipient processes the management key block in its own way, obtains the management key, and decrypts the message.

A known instantiation of a broadcast encryption scheme is IBM® Advanced Secure Content Cluster Technology (ASCCT) which is useful, for example, where a consumer might have a library of entertainment content in his or her home, and wants that library to be freely viewed by all the devices he or she owns. ASCCT uses broadcast encryption to build a cluster of devices to which content can be cryptographically bound to prevent unauthorized copying. ASCCT uses broadcast encryption based on a Management Key Block (MKB). ASCCT devices exchange a set of messages on a network to establish a cluster of devices, each of which shares the same management key block. An ASCCT device uses its set of secret device keys to process the MKB, and thereby to obtain secret keys that enable it to participate in the cluster and gain access to protected content. Both the MKB and Device keys are issued by a licensing authority which oversees the management of the broadcast encryption system.

Devices that implement the ASCCT protocol and its broadcast encryption mechanisms "bind" the content they protect to a particular entity (e.g., a home network or cluster) by encrypting the content with a key (called a Binding Key (Kb) that differs from the one produced by processing a Key Management Block (KMB). Typically, current approaches to binding a piece of content to a particular entity (regardless of whether a piece of media, a device, or a user) is through one level of indirection in the calculation of encryption keys. In these cases, typically the procedure to encrypt a piece of content is basically as follows. First, a Management Key (Km) is extracted by processing a KMB. A one-way function is then performed on a piece of data that uniquely identifies the entity to which this content is being bound (called IDb). The result is the binding key Kb=G (Km, IDb). A random title key (Kt) for the piece of content is chosen and encrypted using Kb. The result is an encrypted title key: EKt=E (Kb, Kt). The content is then encrypted with a chosen random key, and then the encrypted content that results remains associated with the encrypted title key. Any compliant device that has access to the same KMB, IDb and encrypted title key can decrypt the content by reproducing the same Kb and decrypting Kt.

It has been proposed to extend such known broadcast encryption schemes to work with multiple device classes/tiers (i.e., Multiple Management Keys/Variants). To this end, a new "Type" of MKB—called a "unified" MKB—has been proposed. An MKB allows compliant devices to calculate not just Km, but other keys as well. These other keys comprise keys of two types: Management Key Variants (Kmv1, Kmv2, etc.) and Recording Keys (Kr1, Kr2, etc.) In the proposed ASCCT extension, Management Key Variants are keys used for forensic purposes, where prepared content has been authored with different equivalent variations. Preferably, a single device calculates only a single Kmv. A Recording Key is similar to the Management Key Variant, but is used when content is being recorded locally in the cluster and the content does not have built-in variations. In the initial ASCCT scheme, a device used its Device Keys (Kd) to directly derive the Management Key (Km) directly. In this proposed extension, a device can derive its Management Key Variant and is able to derive a "base" Management Key (Km) from using its variant number.

Additionally, the Unified MKB introduces the concept of Management Key Precursors (Km(–i)). With this construct, devices can be assigned a security class number "i" (by MKB subset design) and derive a Management Key Precursor Km(–i) from their Management Key Variant. Devices of higher security classes are assigned higher "i" values. A base security class is Km(0). A device in a higher security class than the base security class can then calculate a Management Key Precursor $K_m^{-1}$ instead of a Management Key. The "i" exponent indicates the particular security class. Devices with higher security classes can calculate precursors for lesser security class devices (i.e., Management Key Precursors with smaller "i" values) up to the base $K_m^0$ value using the following one-way function: $K_m^{-(i-1)}$=AES_G ($K_m^{-(i)}$, kcd), where kcd is a key space-specific constant.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
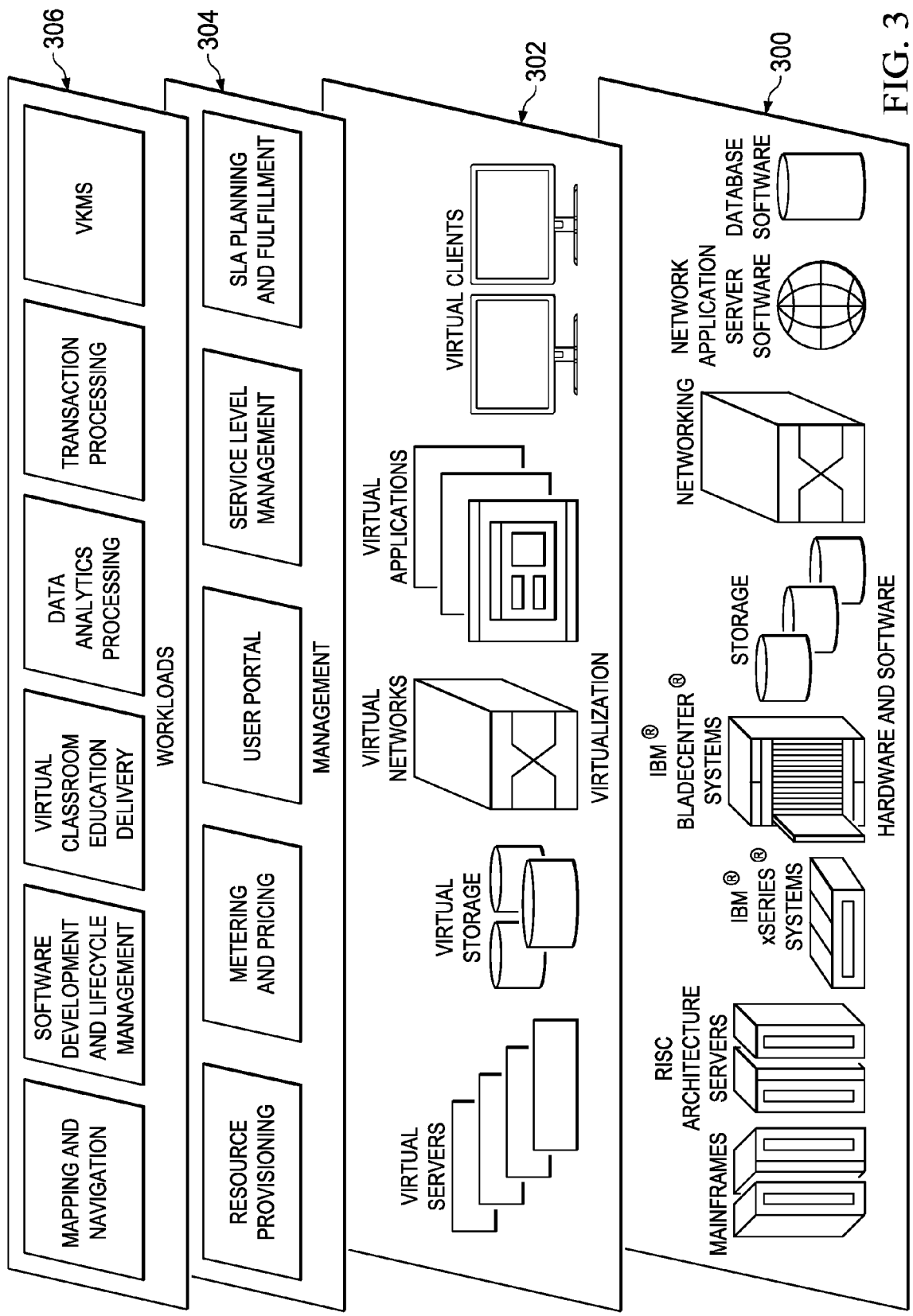
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to this disclosure, a virtual key management system (VKMS).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
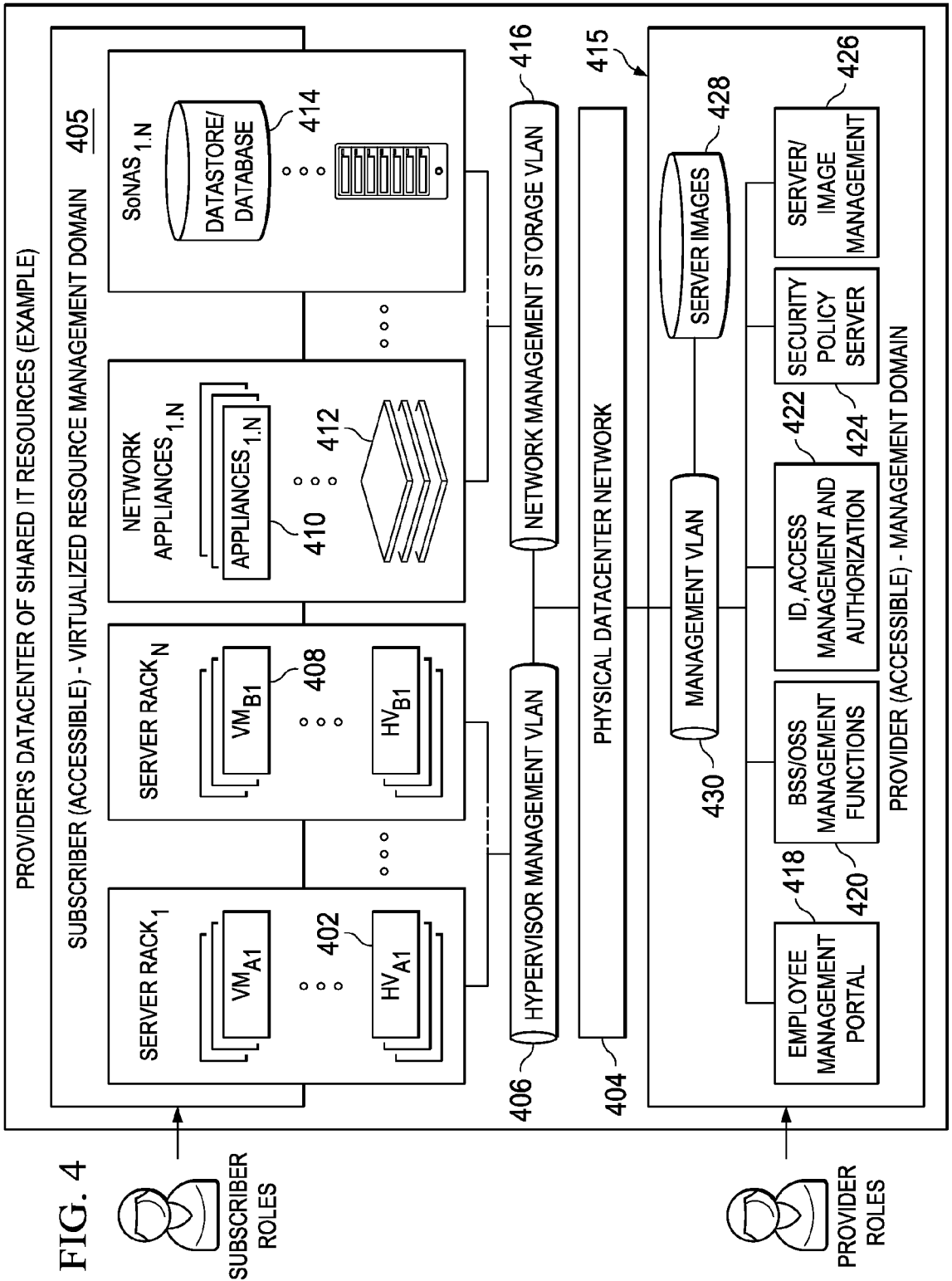
FIG. 4 illustrates an exemplary datacenter in which the broadcast encryption-based Virtual Key Management System (VKMS) and protocol of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Virtual Key Management System (VKMS)

With the above as background, the subject matter of this disclosure is now described. As will be seen, the technique herein uses a virtual key management system and protocol based on broadcast encryption with MKBs and multiple management key variants to support customer end-to-end security of applications and data being run within third party or public (cloud) datacenters wherein such sensitive and private data may be co-tenanted and virtualized. As will be described, broadcast encryption management key variants are using within the third party datacenter to create virtual key management domains on a per-tenant (per-customer) basis so that, wherever a particular customer's data is co-tenanted, stored, transmitted or virtualized in the IT infrastructure of the provider's datacenter, it is secured. The approach isolates the customer's data (including both generic data and applications) from other customer's data, thus thwarting attacks by other tenants (or others) attempting to access data/applications/messages with which their data is being stored, run or virtualized (e.g., stored with the same databases or data stores, run within the same web servers, hypervisors, routers, etc.). As will be seen, broadcast encryption as used herein provides a robust solution to the problem of protecting co-tenanted and virtualized data in that it offers the simplicity of symmetric encryption using pre-broadcast (device or application) keys, preferably at various trust levels assigned to the management key variants. This approach obviates the other key management systems, such as PKI, which would other require the complexity of introducing protocols and interfaces, as well as the generation of key pairs for each application within the datacenter, and that would not account for the various trust levels that may be needed or desired. Further, and as will be seen, the approach also enables integrated control for customers to revoke and classify system IT resources at a granularity necessary to isolate their data on co-tenanted/shared resources.

Figure 5:
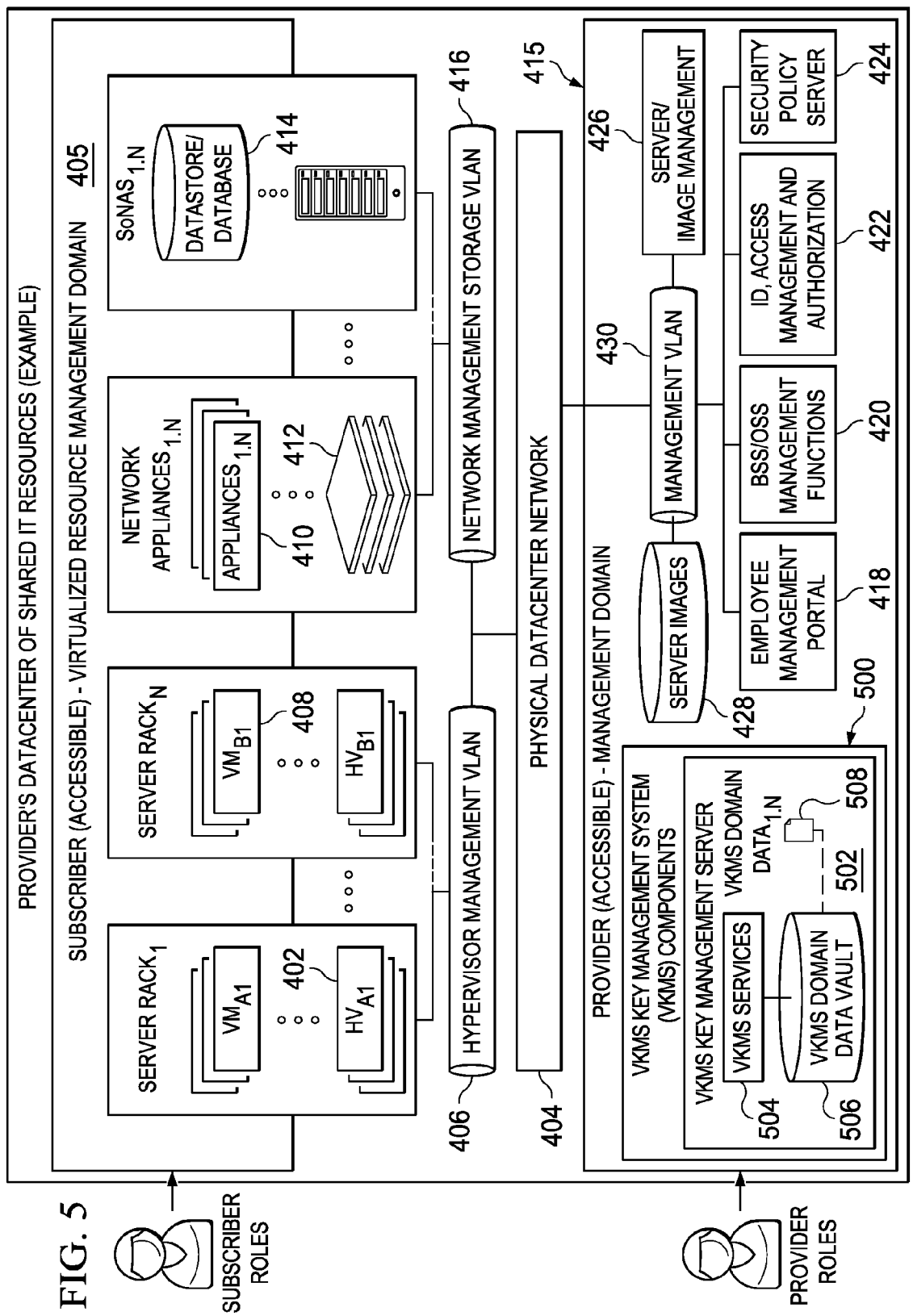
FIG. 5 illustrates that datacenter of FIG. 4 that is extended to include a Virtual Key Management System (VKMS) according to this disclosure.

FIG. 5 illustrates a representative embodiment of a Virtual Key Management System (VKMS) 500 that has been added to the provider infrastructure described above with respect to FIG. 4. As will be seen, VKMS and its associated protocol can be virtualized to achieve per-tenant (and even per-application) secured isolation of data that can be used across any combination of resources in a co-tenanted IT infrastructure (and at all levels of the infrastructure). The techniques herein enable cryptographic security within shared (or cloud) datacenters at and between/among all levels (resources) of the IT system infrastructure that is used within these datacenters. Such IT system infrastructure comprises, without limitation, network (e.g., switches, load balancers and routers, etc.), storage (e.g., hard drives, network attached storage, memory, etc.), host system software (e.g., application processors, CPUs, etc.), servers (e.g., proxies, application servers, web servers, etc.), and hosted software applications/services. As noted above, the term data as applied to customer or tenant data may refer to both generic data (whether in transit or at rest), and software applications.

In general, VKMS virtualizes a subscriber (tenant)-controlled key management system and uses a key management protocol to administer end-to-end security across a diverse shared infrastructure.

VKMS 500 comprises a preferably isolated and dedicated set of hardware and software resources within the provider-accessible management domain 515. Generally, the VKMS 500 securely manages all cryptographic keying materials (e.g., domain-specific key management system parameters, configurations, keys, device and component identifiers, and the like). The VKMS 500 comprises a Virtual Key Management Server 502 that provides VKMS Services 504 in association with a VKMS Domain Data Vault 506 in which VKMS Domain Data 508 is stored. Although the server 502 is shown as a single integrated instance, this is not a limitation, as the server (and its services and data vault) may be located across multiple physical machines, networks and locations.

Figure 6:
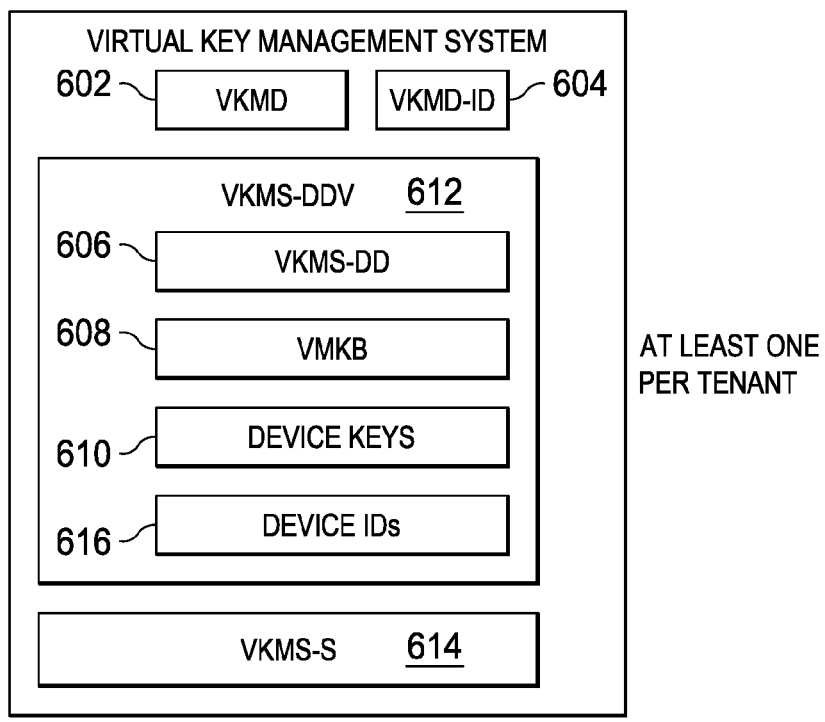
FIG. 6 illustrates representative elements of the Virtual Key Management System (VKMS) in more detail.

FIG. 6 illustrates representative elements of the Virtual Key Management System (VKMS) 600 in more detail. The nomenclature herein is used for exemplary purposes and should not be taken to limit the disclosed subject matter.

According to this disclosure, a VKMS (Data) Domain (VKMD) 602 is associated with a particular customer or tenant. In particular, a customer, based upon their security and isolation requirements, chooses a desired level of granularity among the applications they wish to place in the IT environment and according to which are entitled to the same sharing of data. For example, a customer might have a security policy that requires each application to be isolated and partitioned from the other. Still others might allow two or more applications to share the same data. Depending upon the desired granularity, the customer or provider defines (e.g., using a web-based interface or configuration tool) one or more "data domains," each of which can be isolated and secured from others using the techniques described herein. A customer may have more than one VKMD. Each VKMD Data Domain has its own unique VKMD Identifier (VKMD-ID) 604, which is a unique identifier (either universally unique or at least unique within a given VKMS) for the VKMD. Each VKMD has associated VKMD domain data (VKMS-DD) 606 that comprises the configurations and parameters needed to establish a Virtual Management Key Block (VMKB) 608, Device Keys 610 (for virtual devices, appliances, applications, client devices, server devices, databases, software components, storage media, IT resources, and the like), and which are uniquely associated with a particular Data Domain within a VKMS. Thus, there is a one-to-one mapping between a VKMD and set of VKMS-DD. Typically, and as will be seen below, the VKMS-DD 606 comprises a set of cryptographic parameters that are used to initialize and configure a VKMD.

The VKMS also comprises the VKMS Domain Data vault (VKMS-DDV) 612, which is the VKMS component that is a secure repository used to contain cryptographic materials, such as the VMKB 608, Device Keys 610, and the like, for one or more VKMDs (i.e., all VKMDs that it manages). There may be multiple vaults. The VKMS Server (VKMS-S) 614 is a highly-secure host system (hardware and software) that provides the secured root of trust for the entire shared IT environment. Its principle function is to manage one or more VKMS Data Domains (and their corresponding data) and isolate each from the other. The Virtual Management Key Block (VMKB) 616 is a Management Key Block (MKB) (as described above) that is designed to only "work" (i.e., to be cryptographically "unlocked" or decipherable) to derive Management Key Variants (Kmvs) for a specific virtual data domain (namely, a VKMD). A Device Identifier (Device ID) 616 is a unique identifier associated with each individual architectural component that resides within a provider's IT infrastructure. The Device ID is created and assigned by the VKMS Server. Preferably, the Device ID contains an indicator of "Trust" level that would indicate what would be the highest Kmv variant the device could derive from an associated (Virtual) Management Key Block (VMKB). Device IDs 616 are used to determine the correct cryptographic path within (Virtual) Management Key Blocks (VKMBs) to apply their Device Keys properly. The Devices within an IT datacenter that are assigned and receive "Device IDs" include, without limitation, hardware devices (e.g., application servers, network routers and switches, client terminals, storage arrays, and the like), hardware appliances (e.g., storage appliances, endpoint monitoring devices, intrusion prevention devices, storage and application server appliances, and the like), virtual devices (e.g., virtual network routers and switches, virtual storage, virtual CPUs, and the like), middleware, platforms, software components, hypervisors, virtual platforms, applications, application data stores and devices (both real and virtual). A Component ID may be referenced as an alternative to using the Device ID, as it can be viewed as a more general term inclusive of both hardware and software components of an IT infrastructure. Component IDs may be used by smaller units of software (services) as, most cloud computing functions are offered in this manner. The VKMS Server securely creates, allocates, and provides a Device ID to each device with a VKMD. Finally, Device Keys 610 are a unique set of cryptographic keys to be assigned and used by each device in a VKMS to cryptographically derive Management Key Variants (Kmvs) from associated Virtual Management Key Blocks (VMKBs).

In operation, the VKMS Server securely creates, allocates, and provides a Device ID to each device with a VKMD. The VKMS Server also designs the Device Keys used to cryptographically "unlock" Management Key Variants (Kmvs) along with associated Device IDs (for "path" derivation). The VKMS Server securely creates, allocates, and provides Device Keys to each device within a VKMD.

FIG. 7 illustrates a representative VKMS DD. The cryptographic parameters typically comprises: an $ID_{vdomain}$, which is a subscriber-requested Domain ID that the VKMS may use directly or indirectly in creating the unique VKMD-ID (which, in turn, is used to identity data bound by VKMS to this specific domain); $iv_0$, an initialization vector used at the beginning of a cipher block chaining (CBC) encryption or decryption chain; $h_0$, a hash initializer using by an asymmetric encryption scheme (AES) hashing function; $s_0$, a confidential, adaptation-specific seed register (e.g., a 128 bit value) initializer used in the calculation of subsidiary device keys and processing keys; $r_0$, a confidential, adaptation-specific constant used to calculated Recording Keys; $t_0$, a confidential, adaptation-specific constant used to calculate Title Keys from a Title Key Block; and $K_{cd}$, representing Key Conversion Data, a confidential, adaptation-specific constant used to calculated Management Keys and Management Key Precursors. Several additional configuration parameters that may be included in the VKMS-DD are shown in the table.

Figure 8:
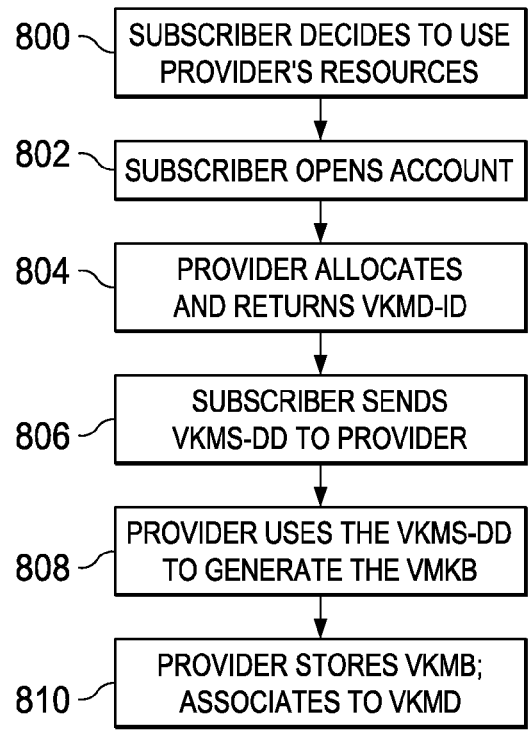
FIG. 8 illustrates a representation process flow by which the VMKS creates and initializes a VKMD on behalf of a customer/tenant.

FIG. 8 illustrates how the VMKS creates and initializes a virtual key management domain (VKMD) on behalf of a customer (tenant)/subscriber. As noted above, a customer may have one or more VKMD, although each customer's VKMD necessarily is distinct from a virtual key management domain created for another customer. More generally, a customer's VKMD is unique to the customer. A typical customer or tenant establishes a single VKMD. Larger entities, however, may create a separate VKMD for different lines of business, to address legal considerations, or to accommodate separate security policies for different groups within their organization.

The routine beings at step 800 when the Subscriber A decides to advantage of the shared IT resource of a public "cloud" Provider A (e.g. a cloud datacenter), e.g., to reduce its fixed IT resource and management costs. At step 802, Subscriber A opens an account with Provider A (e.g., via some Service License Agreement or SLA), which permits Subscriber A to deploy its applications and unstructured data to the Provider's shared infrastructure (meaning the SLA permits sharing or co-tenanting of applications and data). This is a known business process and model. At step 804, Provider A's VKMS Server allocates and returns to the subscriber the VKMD Identifier (VKMD-ID). As noted above, the VKMD-ID is associated with that Subscriber account, and it can be associated with VKMD-specific data for storage within the VKMD-DDV. Without limitation, and with reference to the table shown in FIG. 7, the VKMD-ID may be an $ID_{vdomain}$ the Subscriber provided as part of the VKMS-DD or be derived from it or include it (e.g. as part of a URI naming convention that assures uniqueness within the VKMS). In addition, other data may be associated with the VKMD-ID, such as, without limitation, the VKMS-DD, Device IDs, Device Keys, VKMBs, any associations, VKMD metadata, and the like. In this example, scenario, it is assumed that there is just one VKMD per account; however, a Provider could support a means to manage multiple VKMDs per account, in which case the VKMS Server would then create/track additional VKMD-IDs and associated VKMS-DD, Device IDs, Device Keys, and VKMBs for each VKMD.

The routine then continues at step 806, wherein Subscriber A arranges a secure means to send Provider A its desired set of domain-specific VKMS-DD; Provider A receives and securely stores the VKMS-DD within its VKMS-DD Vault and associates it to Subscriber A's VKMD-ID. This secure means would follow a pre-established mechanism between the subscriber and provider and could be done through any convenient manner. Thus, for example, the VKMS-DD (or some portion thereof) may be provided via an "out-of-band" exchange that is not direct to Provider's IT infrastructure (e.g., delivery via courier, or the like) following a pre-agreed-upon process between the subscriber and provider. Or, the exchange may be carried out via an "in-band" exchange whereby the VKMS-DD is securely (e.g., by nonce, digital signature, encryption) transmitted via electronic message or application programming interface (API) over the Internet from the subscriber to the provider's secure VKMS Services endpoint.

Regardless of the means used to transport the VKMS-DD from the subscriber to the provider, the VKMS-DD should be encrypted and signed by some cryptographic keys. In this regard, any human handling of the subscriber's VKMS-DD should be viewed as highly secure administrative action by both parties, wherein only those persons authorized to handle such data are permitted to do so. As one of ordinary skill will recognize, the disclosed subject matter only seeks to account for the security of the subscriber's data within the provider's infrastructure after the VKMD is established through cryptographic techniques using the Kmvs (keys). Resources and human actors or their management software establish their "trust" by proving they can encrypt and decrypt data (including message data) using the various Kmvs they have to derive. Thus, all authorizations in this system are implicit due to the customer's ability to access and utilize their Device IDs to derive the correct Kmv level to perform a specific action at the assigned trust level. As noted above, preferably the subscriber's VKMS-DD is encrypted and/or physically protected during any electronic or manual/physical transmission. If desired, additional security measures may be taken to assure only trusted employees of the provider and/or subscriber are permitted to handle the VKMD initialization data during transmission and further installation of the data within the Provider's VKMS' secure VKMS-DD Vault.

Referring back to FIG. 8, at step 808, and once the VKMS-DD is installed in the VKMS-DDV at Provider A, Provider A's VKMS Server uses the VKMS-DD that the Subscriber has provided to generate the VMKB with the correct dimensions and structure (e.g. "N" tree dimensions, depth, width, etc. of the NNL-tree MKB as embodied herein) to represent a maximum number of "devices" (so-called "Necessary Devices") that need to be included in the VKMD. In this manner, the Virtual Management Key Block (VMKB) is designed with enough "paths" to assure enough "Device IDs" (and associated Device Keys) can be encoded within it. In particular, and as will be described in more detail below, the MKB is generated to support a sufficient number of "Device IDs" of various "class" levels to sufficiently distribute and assign them to all "Necessary" devices (e.g., network, storage, host system hardware, servers, hosted software applications/services, etc.) within the Provider's IT datacenter infrastructure that may be allocated or provisioned to store, run or transmit the corresponding Subscriber's applications and data. The MKB may also be generated to accommodate a sufficient number of Devices IDs for allocation to the Subscriber to enable the Subscriber to assign to (transmit and install into) their "off premise" servers, applications, services and devices (e.g. computers, mobile phones, etc.). The VKMS Server also ensures that enough "nodes" within the VMKB are allocated to each of the desired "trust" classes (or levels), as will be described in more detail below. As will be seen, each of these classes or levels is cryptographically encoded to contain the correct Kmv values that match the trust level assigned to a given Device ID. The Subscriber requirements for the construction of the VMKB (for its VKMD) are communicated from the Subscriber using the VKMD-DD, and these requirements may include, for example, Cipher, Cipher Strength, key length, MKB Tree depth, Device "Trust" class allocations for sub-trees, and the like, as shown in the Table of FIG. 7. To ensure that the VKMD-DD is within the permitted constraints of the VKMS, any Provider requirements that affect the VMKB construction (e.g., its permitted set of ciphers, key lengths, depths, its number of Device IDs, and "Trust levels", etc.) are well-known and communicated from the Provider to Subscriber(s).

At step 810, the VMKS Server stores the VMKB in the VKMS-DDV and associates it to the VKMD using the VKMD-ID. Preferably, the VKMS Server also stores the complete set of Device IDs, and their associated Device Keys, and stores them to the VKMS-DDV using the VKMD-ID. If desired, the Provider can design its VKMS such that the Device IDs assigned to its infrastructure devices/components can be used for multiple VKMDs, or such that a new Device ID is assigned and transmitted for each VKMD. This means that the VKMS Server only needs to create Device IDs/Keys for its infrastructure "Devices" once but then include (account for) this fixed set of Device IDs (i.e., paths) in every VMKB its creates for every VKMD.

Figure 9:
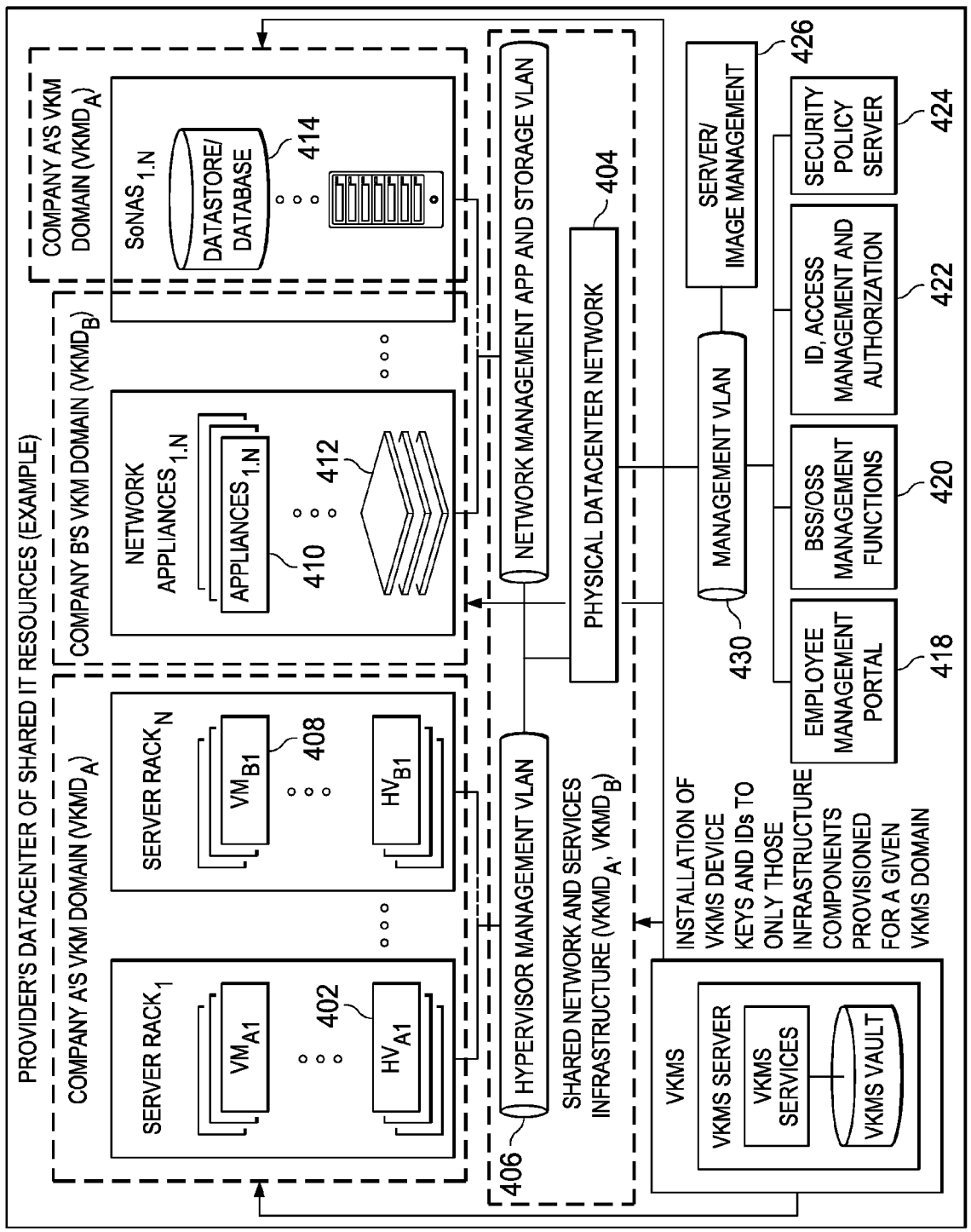
FIG. 9 illustrates the provider's datacenter of shared IT resource after multiple VKM domains are applied.

Once the VMKS Server has created multiple VMKDs in this manner, it then installs the VMKB Device Keys and IDs to only those infrastructure components provisioned for a given VMKB Domain. FIG. 9 illustrates the provider's datacenter of shared IT resource after multiple VKM domains are applied.

Figure 10:
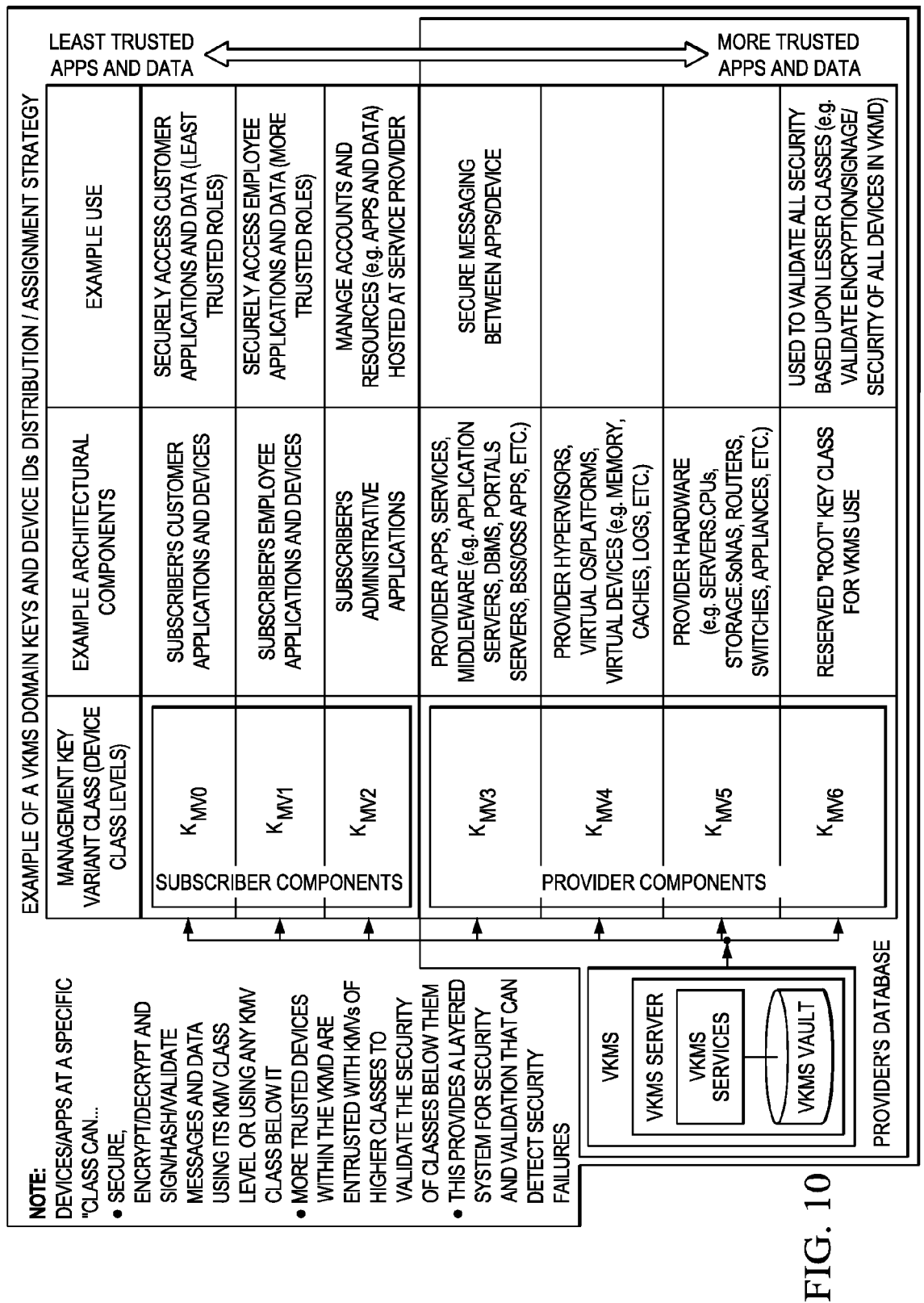
FIG. 10 illustrates a representative datacenter provisioning strategy showing how a customer can provision its applications and data using multiple device trust classes or levels.

The VMKB is generated by the VMKS Server using a provisioning strategy, which is now described by way of example. In this example scenario, there are assumed to be seven (7) device trust classes (or levels) that need to be encoded into any VMKB that is created. This means that the VMKB this example VKMS would create would have seven possible Management Key Variants (Kmvs) or "device trust classes" (i.e., represented as $K_{MV6}$-$K_{MV0}$). In this case, the most trusted devices would be assigned Device IDs that can derive the Management Key Variants "trust class 6" or simply "class 6" (represented as $MKV_6$), whereas a slightly lesser-trusted device might be assigned a Device ID associated with a lower Management Key Variant "class 5" (represented as $MKV_5$), and so on, to the least-trusted devices whose Device IDs would be associated to "class 0" devices (represented as $MKV_0$). FIG. 10 illustrates a sample provisioning strategy for assigning the seven (7) "Trust" levels to components of both the Provider and Subscriber. Of course, this scenario is merely illustrative and should not be taken to limit the disclosed technique. The diagram illustrates how the exemplary "7" "Device" (trust) class levels are assigned based on a degree of trust appropriate for the associated architectural components. The higher the level, the more trusted the component. Components at a given Device class level are able to validate the security of all devices processing levels below them, thereby providing a layered system for security and validation that is able to detect security failures anywhere in the infrastructure for devices lower in the class hierarchy. Preferably, the provisioning strategy also describes how to provision VKMS Domain Keys (i.e. Device Keys), Device IDs and VMKBs, etc., and, in particular, based upon the "trust" associated with access (cryptographically derived) to specific Management Key Variants (by design).

Thus, and as illustrated in FIG. 10, Device class level $K_{MV0}$ is allocated for the Subscriber's customer applications and devices. Persons in the least trusted roles may then be enabled to access those resources. Device class level $K_{MV1}$ is allocated for the Subscriber's employee applications and devices. Persons in more trusted roles may then be enabled to access those resources (as well as those in the less secure class below). Device class level KMV2 is allocated to the Subscriber's administrative applications. Persons who are permitted to manage accounts and resources are permitted to access these resources. The provider components are assigned and allocated to the additional Device class levels as shown, once again just by way of example.

Of course, the example strategy shown in FIG. 10 should not be taken to limit the disclosure. There may be fewer or more layers of trust, and typically there will be a root of trust (not shown). As can be seen, using the provider's infrastructure, the subscriber can easily provision their applications and data, controlling the granularity to which each is isolated from the other.

The following section describes various three (3) distinct Provider options for how the domain-specific (i.e., VKMD specific) VMKB, Device IDs and associated Device Keys are assigned to and installed on the "devices" that are allocated (provisioned by the Provider) to run, manage, handle, store and process a Subscriber's data. The Subscriber is the "owner" of the VKMD. The following options assume that the provisioning strategy shown in FIG. 10 has been adopted, namely, that the Provider has pre-established the "Device" trust class levels assigned to components of its infrastructure. Regardless of which option is implemented, the following assumptions are made. First, the VKMS Server performs tracking (by location, or association to other system identifiers) such that a Device ID and Device Key can never be associated to another device. Second, the VKMS Server securely transmits these Device IDs (preferably electronically) to each device/component. Ideally, this is done over a secure network and the Device ID is secured via encryption and made tamper-proof via digital signing/hashing so that each receiving device (or component) is able to verify its security and decrypt the Device ID. Further, each device/component that receives a Device ID (after verifying and decrypting it as necessary) can store securely this ID within a secure location either directly within its own storage, or other storage that can be accessed securely.

A first option provides pre-determined provisioning to Provider devices. In this approach, the Provider's VKMS Server is able is able to "pre-determine" which "devices" it will need to have provisioned in order to handle a particular Subscriber's data processing and storage needs. This may be communicated in terms of SLAs, or the like. The Provider may also know other information, such as scalability requirements, peak usage demands, or other special event demands that a particular Subscriber may require the Provider to be able to "scale" to meet. These may be described in an SLA or communicated to the Provider in an "out of band" communication. Preferably, the VKMS Provider is able to configure the VKMS Server to "store" these requirements in the VKMD-DDV and to associate them to that Subscriber using its VKMD-ID.

A second option provides "on-demand" provisioning to the Provider devices. In this approach, and regardless of advanced planning and communication of requirements to the Provider of the Subscriber's resource needs, the Provider may implement "on-demand" provisioning. This option is similar to the previous option, except that the Provider's infrastructure (e.g., general provisioning system, OSS systems, performance monitors, etc.) must be configured accordingly. This option may also be used in a failover scenario, where monitoring devices/software within the Provider's datacenter detect a failure on a particular device (or often a set of devices) assigned to a particular VKMD. In such case, the VMKS Server can provision additional Device IDs and Keys that can be used to temporarily or permanently secure data from the associated Subscriber that is impacted by the failure. This option may also be used during change management operation. Thus, for example, if the Provider is doing maintenance or updates on devices/resources assigned to a particular VKMD, it can have the VMKS Server dynamically provision additional Device IDs and Keys that can be used to temporarily handle data secure data from for the associated Subscriber.

A third option provides provisioning to Subscriber devices. The above-described static/pre-determined allocation and "on-demand" allocation of Device IDs, Keys and VMKB described for the Provider (i.e., Kmv classes 3-6 in FIG. 10) may be implemented in a similar manner to provide these materials for the external Subscriber devices/clients (i.e., Kmv classes 0-2 in FIG. 10). In this option, the Subscriber preferably has a central "trusted" service (secure with at least Kmv class 2 trust) that provides a provisioning service for just its (external to Provider) IDs and Key materials (those in the set of Kmv class 0-2 devices).

As a variant, the VKMS Server may permit centralized control over the security structure of a given IT environment, or over multiple classes of customers or applications that are deployed in one or more shared environments.

The service provider may implement lifecycle operations for the VKMD, such as revocations, renewals, and the like. Thus, for example, the provider may offer "revocation" services that the customer may use to remove certain Device IDs (or whole device classes) from the VKMD so that they can no longer access data protected using the MKB's various management key variants. In one embodiment, devices of "high trust" are established with the credentials needed to authorize such a "revocation" action, or other permitted actions. These revocations may then be accumulated by the VKMS on behalf of that VKMD until a "renewal" occurs, or an individual revocation may be acted upon its receipt. Renewal may be done on a periodic basis, or by a direct authorized request by the customer using a device that belongs to the high trust class and thus has been granted such an authorization privilege. Devices of this type (that can perform management functions) may be established by agreement with the provider, or as part of a configuration/setup, and there may be a specific "trust level" established within a VKMD for such devices. More generally, the VKMS may periodically "renew" the MKB for a given VKMD (perhaps against an established schedule established with the customer or tenant). In this manner, a new MKB would be created by the VKMS for a VKMD and distributed to all devices that participate in that domain. Existing or new messages may then be used to carry (push out) the new MKBs, or some indicator may be sent out to participating devices so that these devices then pull a new MKB from a service the provider offers. The above are merely examples of typical VKMD lifecycle operations that may be implemented by or in association with the service provider. Other such lifecycle services include, without limitation, disablement (temporary) or closure/termination (permanent) of a VKMD, a service for archiving VKMD information, a service to permit modifications of parts (e.g., crypto algorithms and their elements) of the VKMD-DD (each such modification typically would force some type of renewal with indicators of the change that occurred), a service by which the provider provides additional trusted services within the MKB for a VKMD (which is possible because the MKB is "self-signed" at all trust levels and validated by any member devices with a valid (non-revoked) Device ID), etc.

The techniques for generating the management key blocks used in the broadcast encryption may vary. Preferably, the key blocks are generated using NNL trees and other advanced techniques, although older matrix-based techniques with simple row-column lookups may be used as well.

The subject matter described herein has significant advantages over the prior art. According to the approach that has been described above, tenants in a multi-tenant shared deployment are provided their own distinct key spaces over which they control a key management system. In this manner, virtual key management domains are created on a per-tenant (per-customer) basis so that, whenever a particular customer's data is co-tenanted, stored, transmitted or virtualized in the IT infrastructure of the provider's datacenter(s), it is secured using key management materials specific to that customer. This assures that the entirety of a tenant's data (including, without limitation, all generic data, and software applications) remains secure by cryptographically isolating it from other tenants' applications. Preferably, the virtual key management domains are established using a management key variant of a broadcast encryption (BE) protocol. This protocol achieves per-tenant secured isolation of data and can be used across any combination of resources in or across all levels of a co-tenanted IT infrastructure. Using this approach, each tenant can create and initialize a unique (or "custom") virtual key management domain that expresses the customer's own configurations and parameters (as set forth in a VKMS-DD). Within a particular VKMS data domain (VKMD), and using broadcast encryption management key variants, a customer can then set up and enforce a desired set of device trust classes.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the Virtual Key Management Server (VKMS) is implemented in software, which includes but is not limited to firmware, resident software, microcode, and the like. Furthermore, the VKMS and related functions can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Storage devices may include removable media, such as SD cards. The computer-readable medium is a tangible, non-transitory item. Any of these devices can be used to store information protected by a VMKS.

Any cloud datacenter resource may host a VKMS component as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the Virtual Key Management System components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the framework functionality provided herein may be implemented as an adjunct or extension to an existing cloud compute management solution.

The techniques described herein may be used in virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of key management in a multi-tenant computing infrastructure, comprising:
    creating a distinct virtual key management domain for each of first and second tenants, the virtual key management domain having associated therewith key materials specific to each respective tenant, the key materials including a virtual key management block from which a set of virtual key management variants are derivable by one or more devices in the multi-tenant computing infrastructure to which data and applications associated with the respective tenant are allocated or provisioned;
    providing the key materials to the tenant; and
    using the distinct virtual key management domains to isolate first data that has been secured by key materials specific to the first tenant from second data that has been secured by key materials specific to the second tenant.

2. The method as described in claim 1 wherein the first data and the second data are associated with a same co-tenanted resource in the multi-tenant computing infrastructure.

3. The method as described in claim 1 wherein a respective tenant's virtual key management domain is associated with a given portion of the multi-tenant computing infrastructure.

4. The method as described in claim 1 wherein the key materials specific to the tenant further include a set of one or more device keys, and a set of one or more device identifiers, wherein a device key is a cryptographic key used to derive a key management variant of the set of virtual key management variants from the virtual management key block, and a device identifier is associated with a component within the multi-tenant computing infrastructure and is used to determine a cryptographic path within the virtual management key block to apply a given one of the device keys.

5. The method as described in claim 4 further including using the one or more management key variants to associate one or more trust levels to resources within the multi-tenant computing infrastructure.

6. The method as described in claim 5 wherein a component within a given trust level validates security for at least one device within a trust level that is less secure than the given trust level.

7. The method as described in claim 1 wherein the virtual key management domain is created using a broadcast encryption scheme.

8. Apparatus, comprising:
    a processor;
    computer memory holding computer program instructions that when executed by the processor perform a method of key management in a multi-tenant computing infrastructure, the method comprising:
        creating a distinct virtual key management domain for each of first and second tenants, the virtual key management domain having associated therewith key materials specific to each respective tenant, the key materials including a virtual key management block from which a set of virtual key management variants are derivable by one or more devices in the multi-tenant computing infrastructure to which data and applications associated with the respective tenant are allocated or provisioned;
        providing the key materials to the tenant; and
        using the distinct virtual key management domains to isolate first data that has been secured by key materials specific to the first tenant from second data that has been secured by key materials specific to the second tenant.

9. The apparatus as described in claim 8 wherein the first data and the second data are associated with a same co-tenanted resource in the multi-tenant computing infrastructure.

10. The apparatus as described in claim 8 wherein a respective tenant's virtual key management domain is associated with a given portion of the multi-tenant computing infrastructure.

11. The apparatus as described in claim 8 wherein the key materials specific to the tenant further include a set of one or more device keys, and a set of one or more device identifiers, wherein a device key is a cryptographic key used to derive a key management variant of the set of virtual key management variants from the virtual management key block, and a device identifier is associated with a component within the multi-tenant computing infrastructure and is used to determine a cryptographic path within the virtual management key block to apply a given one of the device keys.

12. The apparatus as described in claim 11 wherein the method further includes using the one or more management key variants to associate one or more trust levels to resources within the multi-tenant computing infrastructure.

13. The apparatus as described in claim 12 wherein a component within a given trust level validates security for at least one device within a trust level that is less secure than the given trust level.

14. The apparatus as described in claim 8 wherein the virtual key management domain is created using a broadcast encryption scheme.

15. A computer program product in a non-transitory computer readable medium for use in a data processing system, the computer program product holding computer program instructions which, when executed by the data processing system, perform a method of key management in a multi-tenant computing infrastructure, the method comprising:
    creating a distinct virtual key management domain for each of first and second tenants, the virtual key management domain having associated therewith key materials specific to each respective tenant, the key materials including a virtual key management block from which a set of virtual key management variants are derivable by one or more devices in the multi-tenant computing infrastructure to which data and applications associated with the respective tenant are allocated or provisioned;
    providing the key materials to the tenant; and
    using the distinct virtual key management domains to isolate first data that has been secured by key materials specific to the first tenant from second data that has been secured by key materials specific to the second tenant.

16. The computer program product as described in claim 15 wherein the first data and the second data are associated with a same co-tenanted resource in the multi-tenant computing infrastructure.

17. The computer program product as described in claim 15 wherein a respective tenant's virtual key management domain is associated with a given portion of the multi-tenant computing infrastructure.

18. The computer program product as described in claim 15 wherein the key materials specific to the tenant further include a set of one or more device keys, and a set of one or more device identifiers, wherein a device key is a cryptographic key used to derive a key management variant of the set of virtual key management variants from the virtual management key block, and a device identifier is associated with a component within the multi-tenant computing infrastructure and is used to determine a cryptographic path within the virtual management key block to apply a given one of the device keys.

19. The computer program product as described in claim 18 wherein the method further includes using the one or more management key variants to associate one or more trust levels to resources within the multi-tenant computing infrastructure.

20. The computer program product as described in claim 19 wherein a component within a given trust level validates security for at least one device within a trust level that is less secure than the given trust level.

21. The apparatus as described in claim 15 wherein the virtual key management domain is created using a broadcast encryption scheme.

22. A cloud compute infrastructure, comprising:
    a virtual key management server that executes on a hardware element and that creates, for each of the first and second tenants, a distinct virtual key management domain, the virtual key management domain having associated therewith key materials specific to each respective tenant, the key materials including a virtual key management block from which a set of virtual key management variants are derivable by one or more devices in the multi-tenant computing infrastructure to which data and applications associated with the respective tenant are allocated or provisioned; and
    a set of shared resources, wherein at least one resource is adapted to be shared by the first and second tenants;
    wherein, with respect to the at least one resource, first data that has been secured by key materials specific to the first tenant is isolated cryptographically from second data that has been secured by key materials specific to the second tenant data.

* * * * *